Nov. 24, 1970   L. G. MANINO   3,542,639
RUBBER-TO-METAL ADHESIVE AND ITS USE
Filed Jan. 26, 1967
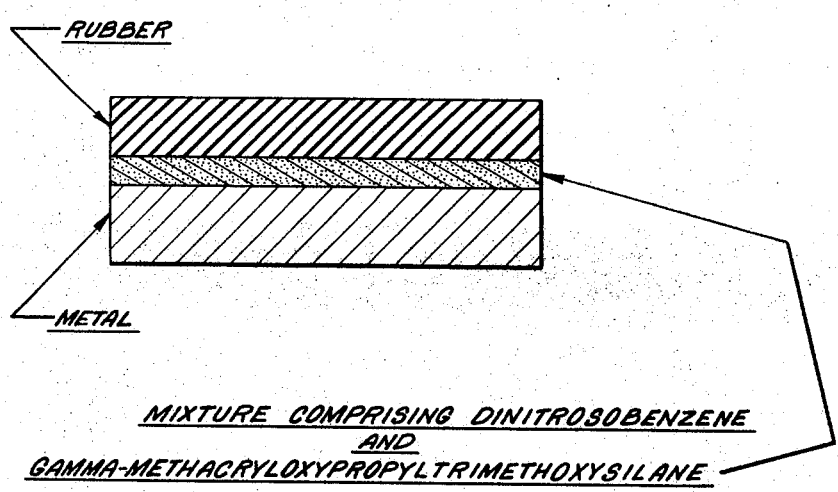
INVENTOR:
LOUIE G. MANINO United States Patent Office 3,542,639
Patented Nov. 24, 1970

3,542,639
RUBBER-TO-METAL ADHESIVE AND ITS USE
Louie G. Manino, Erie, Pa., assignor to Lord Corporation,
Erie, Pa., a corporation of Pennsylvania
Filed Jan. 26, 1967, Ser. No. 611,878
Int. Cl. B32b *13/06, 15/08;* C07d *103/02*
U.S. Cl. 161—186                                33 Claims

ABSTRACT OF THE DISCLOSURE

A mixture comprising gamma-methacryloxypropyltrimethoxysilane and dinitrosobenzene for bonding rubber to metal. In preferred embodiments a chlorine-containing polymer, a polyisocyanate or epoxylated novolak, or combinations thereof are incorporated in the mixture.

There is a need in industry for a one-coat (not requiring a primer) adhesive composition capable of bonding a wide variety of rubbers to a wide selection of metals. This need is especially great where, in addition to this stated versatility, the bond provided should exhibit high environmental resistance, such as resistance to heat, water, chemicals, and the like to which the bonded structure may be subjected in use. Rubber-to-metal adhesives of general applicability are disclosed in Pats. 2,900,292; 3,099,632; 3,258,388 and 3,258,389.

It is the principal object of the present invention to provide a novel adhesive composition for bonding rubber to metal.

It is another object of the present invention to provide a novel adhesive composition which exhibits high versatility in its ability to bond a wide variety of rubbers to a wide variety of metals.

It is a further object of the present invention to provide a novel adhesive composition which, in addition to its stated versatility, provides an adhesive bond exhibiting high environmental resistance.

Other objects, including the provision of a novel method for bonding rubber to metal and the provision of a novel adhesive-bonded rubber-metal structure, will become apparent from a consideration of the following specifications and claims.

The adhesive composition of the present invention comprises a mixture of gamma-methacryloxypropyltrimethoxysilane and dinitrosobenzene.

As will appear hereinafter, conventional rubber-to-metal adhesive additives like carbon black, zinc oxide, and the like, may be included in the composition. As will also appear hereinafter, other materials providing unexpected improvements with the stated mixture of gamma-methacryloxypropyltrimethoxysilane and dinitrosobenzene, such as a polyisocyanate, an epoxylated novolak, a chlorine-containing polymer and various combinations of these, may be included in the adhesive composition.

In the drawing, the figure represents a side elevational schematic view of a rubber-metal structure bonded in accordance with the present invention.

Gamma-methacryloxypropyltrimethoxysilane has the formula:

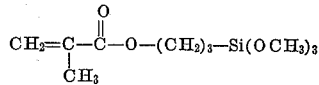

It is reasonable to assume that ethoxy, propoxy or acetoxy groups may replace the methoxy (OCH₃) groups to provide a substituted silane which, for the purposes of the present invention, is the equivalent of gamma-methacryloxypropyltrimethoxysilane. It is also thought that other hydrolyzable elements or radicals, such as chlorine groups, for example, may replace the methoxy groups. A further possibility is that one or more of the methoxy (or other hydrolyzable) radicals may be replaced by lower alkyl groups, such as methyl, ethyl or propyl, or other groups considered substantially inert to hydrolysis, to form compounds which still retain sufficient similarity to gamma-methacryloxypropyltrimethoxysilane to serve as acceptable equivalents, for the purposes of the present invention, for the gamma-methacryloxypropyltrimethoxysilane. For simplicity hereinafter, this component will be referred to as the "silane."

As is known, dinitrosobenzene exists in two isomeric forms, meta and para. The ortho form does not exist as such. Hence, reference to dinitrosobenzene herein will be understood to mean the meta- and para-isomers.

In the adhesive composition of the present invention, the relative proportions of silane to dinitrosobenzene may vary somewhat depending, for example, on the presence or absence of other additives and the specific nature thereof. In general, the silane will be present in an amount to provide, per part by weight of dinitrosobenzene, at least about 0.1 and not more than about 7.5 parts by weight thereof. Preferably, the amount of silane is such as to provide, per part by weight of dinitrosobenzene, from about 0.25 to about 5 parts by weight thereof, with the optimum relative proportion being from about 1 to about 3 parts by weight of silane per part of dinitrosobenzene.

Rubber bodies that may be bonded according to the present invention include natural rubber and synthetic rubbers. The rubber may be polar; that is, it may be a synthetic elastomer having recurring functional groups, such as chlorine or nitrile radicals, in the polymer chain. Examples of such polar rubbers are polychloroprene (poly 2-chlorobutadiene-1,3) and nitrile rubbers (copolymers of butadiene and acrylonitrile). The rubber may be essentially non-polar such as the hydrocarbon rubbers like natural rubber, butyl rubber, styrenebutadiene copolymers (SBR), and the like.

The metal surfaces which may be bonded to the rubber body according to the present invention may be ferrous or non-ferrous metals, such as steel (including stainless steel), copper (including copper alloys like brass), aluminum (including aluminum alloys), silver, magnesium (including magnesium alloys), chromium, cadmium, nickel, zinc, titanium and the like.

In a preferred embodiment of the invention, there is included in the adhesive composition a chlorine-containing, film-forming polymer. Examples of such polymers are chlorsulfonated polyethylene, chlorinated ethylene-propylene copolymers and terpolymers, polychloroprene (poly 2-chlorobutadiene-1,3), chlorinated polyvinylchloride, chlorinated polyethylene and chlorinated natural rubber.

Chlorsulfonated polyethylene generally contains from about 10 to about 60% (preferably from about 15 to about 45%) of chlorine and from about 0.1 to about 5% (preferably from about 0.2 to about 2.5%) of sulfur. It is believed that most of the chlorine is substituted along the hydrocarbon chain and that the sulfur is combined with the chlorine being attached to the chains as sulfonyl chloride groups. The substitution is believed to be random, and, in a preferred polymer, there is an average of about one chlorsulfonyl group for every 17 carbon atoms. In general it may be said that the chlorsulfonated polyethylenes have over 20 carbon atoms and molecular weights over 1000. U.S. Pat. 2,405,971 discloses a method of making chlorsulfonated polyethylene.

As to the chlorinated ethylene-propylene copolymers and terpolymers, the terpolymer itself is prepared mainly from ethylene and propylene and a small amount of a diene such as 1,4-hexadiene, 6-methyl-1,5-heptadiene, cyclopentadiene, dicyclopentadiene, and the like. The ethylene normally does not exceed about 75% by weight of the copolymer or terpolymer, and generally equimolecular amounts of the ethylene and propylene are used. The diene in the terpolymer is generally present in an amount from about 1 to about 15 mol percent. Such terpolymers and their preparation are disclosed in, for example, U.S. Pat. 2,933,480, Canadian Pat. 639,401 and British Pat. 880,904. Such copolymers and terpolymers may be chlorinated, as is known, until the resulting chlorinated polymer contains from about 64 to about 70%, by weight, of chlorine.

Chlorinated polyvinylchloride, chlorinated polyethylene and chlorinated rubber are also known materials, the latter two containing about 60–70% by weight of chlorine.

The amount of chlorine-containing polymer employed may vary depending in part upon the particular polymer employed. In most cases, however, it will not exceed about 3 parts, by weight, per part by weight of dinitrosobenzene plus silane. Preferably, the chlorine-containing polymer does not exceed about 2 parts on the foregoing basis. Somewhat smaller amounts of of polychloroprene, chlorinated polyvinylchloride, chlorinated polyethylene and chlorinated rubber may be desired, for instance not over about 0.5 part, by weight, of chlorinated polyethylene and not over about 1 part of the others (polychloroprene, chlorinated polyvinylchloride and chlorinated natural rubber) per part of dinitrosobenzene plus silane. Of course, there is no critical lower limit in the amount of chlorine-containing polymer, but, when used, it will generally be in an amount of at least about 0.02 part, on the foregoing basis, where significant improvement through its presence is realized.

In connection with the foregoing, it is preferred to employ, along with the chlorine-containing polymer, a polyisocyanate like dianisidine diisocyanate. The amount thereof may range from about 0.01 to about 1.5 parts, by weight, per part by weight of dinitrosobenzene plus silane.

In another embodiment of the invention there is included with the dinitrosobenzene-silane mixture, an epoxylated novolak. This material is prepared by reaction of a haloepoxyalkane and a novolak. The novolak resins used in this preparation are well known in the art, being produced by condensing a phenol with an aldehyde, the phenol being present in excess, in the presence of an acidic catalyst. The phenolic hydroxy radicals of these resins react with the haloepoxyalkane to provide the epoxylated novolak. The haloepoxyalkane employed is typically epichlorohydrin, although it can alternatively be such epoxides as 1-chloro-2,3-epoxybutane, 1-bromo-2,3-epoxybutane, and the like. Generally the epoxylation is conducted in alkaline medium such as an aqueous solution of sodium hydroxide. A procedure that may be followed is described in, for example, U.S. Pat. 2,716,099. Epoxylated novolaks prepared from phenol, formaldehyde and epichlorohydrin are commercially available, and a resin of this commercially available type, with an epoxide equivalent (grams of resin containing a gram equivalent of epoxide) of from about 150 to about 190 is a preferred species for use in accordance with this invention.

The amount of epoxylated novolak used may go up to about 3 parts, preferably not over about 2 parts, thereof per part of dinitrosobenzene plus silane. Here again there is no critical lower limit, but in order to realize significant improvement through the inclusion of the epoxylated novolak, it will present in an amount of at least 0.5 part, and preferably at least 1 part, thereof per part of dinitrosobenzene plus silane.

As stated, conventional rubber-to-metal adhesive additives, like carbon black and zinc oxide may be included in the present adhesive composition. Carbon black, as is well known, serves as a filler for adjusting the viscosity of the liquid composition and to provide enhanced cohesive and tensile strengths in the resulting bond.

For ease of application, as is conventional in this art, the components, will be mixed and dispersed in a liquid carrier which, once the composition has been applied, is evaporated off. Normally it is preferred that the carrier be one in which the silane, and chlorine-containing polymer and epoxylated novolak, when used, is soluble. The dinitrosobenzene and polyisocyanate and carbon black when used, need not be dissolved and preferably remains suspended in the solution. Examples of suitable carriers are aromatic hydrocarbons, like benzene, toluene and xylene; chlorinated hydrocarbons, like trichloroethylene, perchloroethylene and propylene dichloride; ketones, like methyl ethyl ketone and methyl isobutyl ketone; and the like. The carrier is preferably volatile at room temperature so that it will leave the applied adhesive within 30 minutes at room temperature. The amount of carrier is not critical and may provide a solids content ranging from about 15% to about 80%, by weight.

In bonding rubber to metal, the adhesive composition is applied to the metal surface or to the rubber surface or to both and dried. The rubber and the metal are then pressed together with the adhesive layer between and heated in accordance with conventional practice. The exact conditions selected may depend upon the particular rubber being bonded and whether or not it is cured. If it is uncured and curing is to occur during bonding, the conditions will be dictated mainly by the curing conditions for that particular rubber which will generally be at a temperature of from about 290 to about 380° F. for from about 5 to about 40 minutes. If the rubber has been precured, the temperature may range from about 200 to about 320° F. for from about 15 to about 120 minutes.

The invention is further described by the following specific examples which are given for the purpose of illustration only and are not intended to limit the scope of the invention in any way.

In the examples, various rubber stocks, designated A, B, C, D and E, are bonded to various metals. Rubber stock A is a natural rubber stock composed of 100 parts, by weight, of smoked sheet, 3 parts of zinc oxide, 2 parts of stearic acid, 1 part of N-phenyl-beta-naphthylamine, 40 parts of carbon black (high abrasive furnace), 0.6 part of N-oxydiethylene benzothiazole-2-sulfenamide and 2.15 parts of sulfur; rubber stock B is a polychloroprene stock composed of 100 parts, by weight, of polychloroprene (Neoprene GNA), 75 parts of carbon black (fine thermal), 10 parts of naphthenic process oil (sp.g. of 0.9230, SUS viscosity at 100° F. of 156), 5 parts of zinc oxide, 4 parts of magnesia, 2 parts of N-phenyl-beta-naphthylamine, 1 part of petrolatum, 1 part of stearic acid and 1 part of sulfur; rubber stock C is buna N stock composed of 100 parts of buna N (butadiene-acrylonitrile copolymer), 1 part of stearic acid, 10 parts of terpene polymer, M.P. 10° C., predominately a polymer of beta-pinene ("Piccolyte S–10" of Pennsylvania Industrial Chemical Corp.) 10 parts of dibutyl phthalate, 5 parts of zinc oxide, 65 parts of carbon black (furnace), 0.3 part of tetramethyl thiuram monosulfide and 1 part of sulfur; rubber stock D is an SBR stock composed of 100 parts SBR (butadienestyrene copolymer), 50 parts of carbon black (high abrasive, furnace), 5 parts of zinc oxide, 1 part of stearic acid, 8 parts of saturated polymerized petroleum hydrocarbons, sp.g. 0.95–1.02, viscosity, Saybolt Furol, at 140° F., 250–350 seconds ("Para-Flux" of the C. P. Hall Co.), 1.75 parts of sulfur and 1.25 parts of N-cyclohexyl-2-benzothiazolesulfenamide; and rubber stock E is a butyl rubber stock composed of 100 parts of butyl rubber, 1 part of stearic acid, 5 parts of zinc oxide, 50 parts of carbon black (high abrasive furnace), 1 part of benzothiazyl disulfide, 1.5 parts tellurium diethyldithiocarbamate and 1 part of sulfur.

In bonding the rubber to the metal, the adhesive composition is applied to the metal surface and air dried. The rubber is then bonded to the metal and tested according to ASTM D429–58, Method B modified to 45°. During the bonding operation in Examples 1–41 the following time and temperature conditions are used for each stock: stock A, 15′ at 307° F.; stock B, 40′ at 307° F.; stock C, 40′ at 407° F.; stock D, 30′ at 307° F., and stock E, 30′ at 320° F.

As stated, the bonded structures are subjected to various tests: room temperature ("R.T.") pull; the boiling water test, and the salt spray test. In the room temperature pull, the rubber body is peeled from the metal at a 45° angle on a Scott Tensile Tester, and the force required in pounds per inch, is recorded. In the boiling water test, bonded samples, after having been prestressed by bending the rubber body back from the metal, are immersed in boiling water for two hours, and in the salt spray test, bonded samples, after prestressing, are exposed to a spray of salt solution (20% sodium chloride) for 48 hours at 100° F. The samples so treated are tested for relative bond strength by pulling the rubber body from the metal.

In the data given in the examples, reference is made to failure in the rubber body ("R") in terms of percent; thus 95R, for instance, means that 95% of the failure occurred in the rubber body itself and not between the adhesive composition and the rubber ("RC") or between the adhesive composition and the metal ("CM").

In Examples 1 to 44, the metal bonded is steel grit-blasted cold rolled steel, and in Examples 1 to 12 the solvent, or liquid carrier, is xylene in an amount of about 2 parts, by weight, per part of dinitrosobenzene in the composition. In Example 13 xylene is used to provide a total solids content of 80%. In the examples, "silane" refers to gamma-methacryloxypropyltrimethoxysilane, and "DNB" refers to p- dinitrosobenzene unless otherwise designated. In Examples 1–13 the figures are averages from two sets of test results:

EXAMPLE 1–13

| Example | Composition, silane: DNB, parts | Stock A R.T. pull, p.p.i. | Stock A Boiling water | Stock B R.T. pull, p.p.i. | Stock B Boiling water | Stock C R.T. pull, p.p.i. | Stock C Boiling water |
|---|---|---|---|---|---|---|---|
| 1 | 0:1 | (*) | (*) | (*) | (*) | (*) | (*) |
| 2 | .01:1 | (*) | (*) | (*) | (*) | (*) | (*) |
| 3 | .05:1 | 9 | RC | 63 | 70R | 48 | 30R |
| 4 | .1:1 | 18 | RC | 45 | 40R | 77 | 70R |
| 5 | .2:1 | 43 | RC | 33 | 15R | 82 | 90R |
| 6 | .3:1 | 45 | RC | 38 | 35R | 76 | 88R |
| 7 | 1:1 | 37 | 35R | 97 | 48R | 86 | 95R |
| 8 | 1.5:1 | 39 | 65R | 77 | 40R | 95 | 95R |
| 9 | 2.5:1 | 48 | 65R | 75 | 55R | 96 | 93R |
| 10 | 5:1 | 49 | 55R | 83 | 23R | 79 | 85R |
| 11 | 7.5:1 | 44 | 8R | 97 | 55R | 63 | 10R |
| 12 | 10:1 | 47 | CM and RC | 102 | 5R | 64 | 5R |
| 13 | 1:0 | (*) | (*) | (*) | (*) | (*) | (*) |

*These samples pulled apart by hand; no cohesion in the adhesive phase.

The following Examples 14 to 41 illustrate specific adhesive formulations, based upon the combination of silane and DNB and containing conventional adhesive additives, like carbon black, zinc oxide, etc., and, in addition, film-forming materials like chlorine-containing polymers, epoxy-novolak resin, etc.

EXAMPLE 14

A composition is prepared by mixing the following:

| | Pts. by wt. |
|---|---|
| Chlorinated ethylene-propylene terpolymer | 40 |
| DNB | 20 |
| Silane | 5 |
| Carbon black | 40 |
| Zinc oxide | 5 |
| Xylene, to 30% total solids content. | |

The ethylene-propylene terpolymer is an interpolymer of ethylene and propylene in a ratio of about 60:40, by weight, and containing 1–2% of cyclopentadiene. It is chlorinated to about 69% chlorine, by weight.

The composition is tested according to the boiling water test, for stock A, giving 90–99R, and according to the salt spray test, for stock B, giving 99–100R.

EXAMPLES 15 and 16

Compositions are prepared by mixing the following:

| | Pts. by wt. |
|---|---|
| Silane | 25 |
| DNB | 10 |
| Chlorosulfonated polyethylene | 1 |
| Dianisidine diisocyanate (DADI) | 25 or 50 |
| Xylene (16.5 pts. with 25 pts. DADI, and 91 parts with 50 parts DADI). | |

The chlorosulfonated polyethylene contains about 26–29% chlorine and about 1.3–1.7% sulfur.

These are tested with the following results, the figures being average for three sets of data:

| | parts DADI | Stock A Boiling water | Stock B Salt spray | Stock C R.T. pull, p.p.i. |
|---|---|---|---|---|
| Example: | | | | |
| 15 | 25 | 88R | 85R | 97 |
| 16 | 50 | 100R | 100R | 106 |

Further compositions prepared as above but containing only 0.5, 2 and 10 parts, respectively, of DADI gave good results on room temperature pull with stock C.

EXAMPLES 17–27

Compositions are prepared like that of Example 15 to which are added various chlorine-containing polymers in amounts as shown in the following table. The polymer added in Examples 17–19 is polychloroprene (poly 2-chlorobutadiene-1,3); that in Examples 20–22 is chlorinated polyvinylchloride (average viscosity of 10% solution in acetone is 22 cp., softening point just below 100° C., "Rhenoflex" of Dynamit-Actien-Gesellshaft); that in Examples 23–24 is chlorinated polyethylene (about 64%, by weight, chlorine) and that in Examples 25–27 is chlorinated natural rubber (about 67%, by weight, chlorine). The data are the average of results from two samples subjected to each test.

| | Parts added polymer | Stock A Boiling water | Stock B Salt spray | Stock C R.T. pull, p.p.i. |
|---|---|---|---|---|
| Example: | | | | |
| 17 | 1 | 93R | 80R | 112 |
| 18 | 10 | 58R | 95R | 119 |
| 19 | 20 | (¹) | 88R | 104 |
| 20 | 1 | 80R | 80R | 104 |
| 21 | 10 | 83R | 90R | 99 |
| 22 | 20 | 60R | 95R | 91 |
| 23 | 1 | 93R | 70R | 103 |
| 24 | 10 | 38R | 85R | 107 |
| 25 | 1 | 80R | 90R | 109 |
| 26 | 10 | 90R | 93R | 112 |
| 27 | 20 | 95R | 83R | 108 |

¹ Results inconclusive: one sample failed between adhesive and metal and the other showed 45R.

EXAMPLES 28-38

Compositions are prepared by mixing the following:

| | Pts. by wt. |
|---|---|
| Silane | 25 |
| DNB | 10 |
| Dianisidine diisocyanate (DADI) | 25 |
| Xylene (see below). | | and adding various chlorine-containing polymers as shown in the following table. The polymer added in Example 28 is chlorsulfonated polyethylene (26–29% chlorine, 1.3–1.7% sulfur); that in Examples 29–31 is chlorinated natural rubber (about 67% chlorine); that in Example 32 is chlorinated polyethylene; that in Example 33 is chlorinated polyvinylchloride; that in Examples 34 and 35 is polychloroprene; and that in Examples 36–38 is the chlorinated ethylene-propylene terpolymer of Example 14.

Xylene is used as the solvent, or liquid carrier. In the examples in which 1 part of polymer is added, the solids content is about 72%; in those in which 10 parts of polymer are added, the solids content is about 54%, and in those in which 20 parts of polymer are added, the solids content is about 44%.

The following data are the average of results from two samples subjected to each test:

| | Parts added polymer | Stock A Boiling water | Stock B Salt spray | Stock C R.T. pull, p.p.i. |
|---|---|---|---|---|
| Example: | | | | |
| 28 | 10 | 70R | 99R | 31 |
| 29 | 1 | 70R | 98R | 115 |
| 30 | 10 | 48R | 99R | 122 |
| 31 | 20 | 60R | 88R | 119 |
| 32 | 1 | 78R | 99R | 110 |
| 33 | 1 | 80R | 97R | 116 |
| 34 | 1 | 70R | 95R | 107 |
| 35 | 10 | 75R | 95R | 109 |
| 36 | 1 | 63R | 93R | 70 |
| 37 | 10 | 83R | 97R | 108 |
| 38 | 20 | 78R | 90R | 117 |

EXAMPLES 39-40

A composition (Example 39) is prepared by first master batching the following materials in a high shear mixer:

| | Pts. by wt. |
|---|---|
| DNB | 20 |
| Chlorinated ethylene-propylene terpolymer | 40 |
| Carbon black | 40 |
| Epoxy novolac | 35 |
| Propylene dichloride and trichloroethylene to 33% solids. | |

The epoxy novolac has an epoxide equivalent of 175–182 and a viscosity, as an 85% solution in acetone, of 500–1200 cps., at 25° C.

On completion of the mix, 5 parts, by weight, of silane is blended into the master batch to complete the composition.

A similar composition (Example 40) is made but omitting the silane.

Results of testing are as follows:

| | Stock A Boiling water | Stock B Salt spray |
|---|---|---|
| Example: | | |
| 39 | 85-100R | 99-100R |
| 40 | 60-80R | 40-60R |

In addition, room temperatures pull tests, using the adhesive of Example 39, with stocks A, B, C, D and E all gave 100% failure in the rubber body (100R).

EXAMPLE 41

A composition is prepared by mixing the following:

| | Pts. by wt. |
|---|---|
| Silane | 5 |
| DNB | 10 |
| Chlorsulfonated polyethylene | 25 |
| Dianisidine diisocyanate (DADI) | 20 |
| Zinc oxide | 5 |
| Carbon black | 10 |
| Trichloroethylene | 25 |
| Xylene | 263 |

This composition is tested according to the boiling water test, for stock A, and according to the salt spray test, for stock B, giving in both instances 100R. However, when the silane is omitted the resulting composition shows unsatisfactory environmental resistance according to the boiling water and salt spray tests, requiring a primer.

In the foregoing Examples 1–41, the elastomer bonded is initially in the uncured state, and is cured during the bonding operation. In the following examples the elastomer bonded is initially precured.

EXAMPLES 42-44

The adhesive composition of Example 39 is used to bond precured stocks A, B and D to grit-blasted cold rolled steel for 30′ at 307° F. with the following results:

| | Precured stock | R.T. pull data p.p.i. | Percent |
|---|---|---|---|
| Example: | | | |
| 42 | A | 52 | 100R |
| 43 | B | 140 | 100R |
| 44 | D | 88 | 43R |

The foregoing examples illustrate the versatility of the present adhesive composition in bonding natural and synthetic elastomers, both uncured and cured. The following examples illustrate its versatility in bonding to metals.

EXAMPLES 45-55

The adhesive composition of Example 39 is used to bond uncured stock D to the metals, properly cleaned, set forth in the following table with the following results:

| | Metal | R.T. pull p.p.i. | Percent |
|---|---|---|---|
| Example: | | | |
| 45 | Stainless steel | 197 | 100R |
| 46 | Aluminum | 163 | 100R |
| 47 | Brass (rule) | 154 | 100R |
| 48 | Silver-plated brass | 161 | 100R |
| 49 | Magnesium | 176 | 78R |
| 50 | Copper | 108 | 33R |
| 51 | Chrome plated steel | 129 | 100R |
| 52 | Cadmium plated steel | 134 | 100R |
| 53 | Nickel plated steel | 133 | 100R |
| 54 | Zinc galvanized steel | 141 | 100R |
| 55 | Titanium | 152 | 100R |

In the foregoing adhesive compositions, m-dinitrosobenzene may be substituted in whole or in part for the p-dinitrosobenzene with comparable results.

Modification is possible in the selection of specific materials and proportions thereof without departing from the scope of the invention.

What is claimed is:

1. An adhesive composition suitable for bonding a rubber body selected from the group consisting of hydrocarbon rubbers, polychloroprene rubber and nitrile rubbers to metal consisting essentially of a mixture of gamma-methacryloxypropyltrimethoxysilane and dinitrosobenzene, in which the former is present in an amount of at least about 0.1 and not more than about 7.5 parts by weight thereof per part by weight of the latter, in a nonaqueous carrier selected from the group consisting of aromatic hydrocarbons, chlorinated hydrocarbons, and ketones.

2. The adhesive composition of claim 1 wherein the gamma-methacryloxypropyltrimethoxysilane is present in an amount from about 0.25 to about 5 parts by weight per part by weight of dinitrosobenzene.

3. The adhesive composition of claim 1 wherein the gamma - methacryloxypropyltrimethoxysilane is present in an amount from about 1 to about 3 parts by weight per part by weight of dinitrosobenzene.

4. An adhesive composition suitable for bonding a rubber body selected from the group consisting of hydrocarbon rubbers, polychloroprene rubber and nitrile rubbers to metal which comprises a mixture of gamma-methacryloxypropyltrimethoxysilane and dinitrosobenzene, in which the former is present in an amount of at least about 0.1 and not more than about 7.5 parts by weight thereof per part by weight of the latter, and a chlorine-containing polymer selected from the group consisting of chlorosulfonated polyethylene, chlorinated ethylenepropylene copolymer, chlorinated ethylenepropylene terpolymer, polychloroprene, chlorinated polyvinylchloride, chlorinated polyethylene and chlorinated natural rubber, said chlorine containing polymer being in an amount not exceeding about 3 parts, by weight, thereof per part by weight of gamma - methacryloxypropyltrimethoxysilane plus dinitrosobenzene in a nonaqueous carrier selected from the group consisting of aromatic hydrocarbons, chlorinated hydrocarbons, and ketones and wherein the gamma-methacryloxypropyltrimethoxysilane and dinitrosobenzene mixture is a major component of the adhesive.

5. The adhesive composition of claim 4 wherein the gamma - methacryloxypropyltrimethoxysilane is present in an amount from about 0.25 to about 5 parts by weight per part by weight of dinitrosobenzene.

6. The adhesive composition of claim 4 wherein the gamma - methacryloxypropyltrimethoxysilane is present in an amount from about 1 to about 3 parts by weight per part by weight of dinitrosobenzene.

7. The adhesive composition of claim 4 wherein the gamma - methacryloxypropyltrimethoxysilane is present in an amount from about 0.25 to about 5 parts by weight per part by weight of dinitrosobenzene, and wherein the chlorine-containing polymer is present in an amount not exceeding about 2 parts, by weight, thereof per part by weight of gamma - methacryloxypropyltrimethoxysilane plus dinitrosobenzene.

8. The adhesive composition of claim 7 wherein the gamma - methacryloxypropyltrimethoxysilane is present in an amount from about 1 to about 3 parts by weight per part by weight of dinitrosobenzene.

9. The adhesive composition of claim 4 containing also dianisidine diisocyanate in an amount from about 0.01 to about 1.5 parts, by weight, per part by weight of gamma - methacryloxypropyltrimethoxysilane plus nitrosobenzene.

10. The adhesive composition of claim 9 wherein the gamma - methacryloxypropyltrimethoxysilane is present in an amount from about 0.25 to about 5 parts by weight per part by weight of dinitrosobenzene.

11. The adhesive composition of claim 9 wherein the gamma - methacryloxypropyltrimethoxysilane is present in an amount from about 1 to about 3 parts by weight per part by weight of dinitrosobenzene.

12. The adhesive composition of claim 9 wherein the gamma - methacryloxypropyltrimethoxysilane is present in an amount from about 0.25 to about 5 parts by weight per part by weight of dinitrosobenzene, and wherein the chlorine-containing polymer is present in an amount not exceeding about 2 parts, by weight, thereof per part by weight of gamma - methacryloxypropyltrimethoxysilane plus dinitrosobenzene.

13. The adhesive composition of claim 12 wherin the gamma - methacryloxypropyltrimethoxysilane is present in an amount from about 1 to about 3 parts by weight per part by weight of dinitrosobenzene.

14. An adhesive composition suitable for bonding a rubber body selected from the group consisting of hydrocarbon rubbers, polychloroprene rubber, and nitrile rubbers to metal which comprises a mixture of gamma-methacryloxypropyltrimethoxysilane and dinitrosobenzene, in which the former is present in an amount of at least about 0.1 and not more than about 7.5 parts by weight thereof per part by weight of the latter, and epoxylated novolak in an amount not exceeding about 3 parts by weight, thereof per part by weight of gamma-methacryloxypropyltrimethoxysilane plus dinitrosobenzene in a nonaqueous carrier selected from the group consisting of aromatic hydrocarbons, chlorinated hydrocarbons, and ketones and wherein the gamma-methacryloxypropyltrimethoxysilane and dinitrosobenzene mixture is a major component of the adhesive.

15. The adhesive composition of claim 14 wherein the gamma - methacryloxypropyltrimethoxysilane is present in an amount from about 0.25 to about 5 parts by weight per part by weight of dinitrosobenzene.

16. The adhesive composition of claim 14 wherein the gamma - methacryloxypropyltrimethoxysilane is present in an amount from about 1 to about 3 parts by weight per part by weight of dinitrosobenzene.

17. The adhesive composition of claim 14 wherein the gamma - methacryloxypropyltrimethoxysilane is present in an amount from about 0.25 to about 5 parts by weight per part by weight of dinitrosobenzene and wherein the epoxylated novolak is present in an amount not exceeding about 2 parts, by weight, thereof per part by weight of gamma-methacryloxypropyltrimethoxysilane plus dinitrosobenzene.

18. The adhesive composition of claim 17 wherein the gamma - methacryloxypropyltrimethoxysilane is present in an amount from about 1 to about 3 parts by weight per part by weight of dinitrosobenzene.

19. The adhesive composition of claim 4 containing also epoxylated novolak in an amount not exceeding about 3 parts, by weight, thereof per part by weight of gamma - methacryloxypropyltrimethoxysilane plus dinitrosobenzene.

20. The adhesive composition of claim 19 wherein the gamma - methacryloxypropyltrimethoxysilane is present in an amount from about 0.25 to about 5 parts by weight, per part by weight of dinitrosobenzene; wherein the chlorine-containing polymer is present in amount not exceeding about 2 parts, by weight, per part by weight of gamma-methacryloxypropyltrimethoxysilane plus dinitrosobenzene, and wherein the epoxylated novolak is present in an amount not exceeding about 2 parts, by weight, thereof per part by weight of gamma - methacryloxypropyltrimethoxysilane plus dinitrosobenzene.

21. An adhesively-bonded rubber-metal structure comprising a rubber body bonded to a metal body with the adhesive composition of claim 1.

22. An adhesively-bonded rubber-metal structure comprising a rubber body bonded to a metal body with the adhesive composition of claim 2.

23. An adhesively-bonded rubber-metal structure comprising a rubber body bonded to a metal body with the adhesive composition of claim 3.

24. An adhesively-bonded rubber-metal structure comprising a rubber body bonded to a metal body with the adhesive composition of claim 5.

25. An adhesively-bonded rubber-metal structure comprising a rubber body bonded to a metal body with the adhesive composition of claim 6.

26. An adhesively-bonded rubber-metal structure comprising a rubber body bonded to a metal body with the adhesive composition of claim 8.

27. An adhesively-bonded rubber-metal structure comprising a rubber body bonded to a metal body with the adhesive composition of claim 10.

28. An adhesively-bonded rubber-metal structure comprising a rubber body bonded to a metal body with the adhesive composition of claim 11.

29. An adhesively-bonded rubber-metal structure comprising a rubber body bonded to a metal body with the adhesive composition of claim 13.

30. An adhesively-bonded rubber-metal structure comprising a rubber body bonded to a metal body with the adhesive composition of claim 15.

31. An adhesively-bonded rubber-metal structure comprising a rubber body bonded to a metal body with the adhesive composition of claim 16.

32. An adhesively-bonded rubber-metal structure comprising a rubber body bonded to a metal body with the adhesive composition of claim 18.

33. An adhesively-bonded rubber-metal structure comprising a rubber body bonded to a metal body with the adhesive composition of claim 20.

References Cited

UNITED STATES PATENTS

| | | | |
|---|---|---|---|
| 3,099,632 | 7/1963 | DeCrease | 260—3.3 |
| 3,258,388 | 6/1966 | Coleman et al. | 161—221 X |
| 3,282,883 | 11/1966 | DeCrease et al. | 261—41 |
| 3,317,369 | 5/1967 | Clark et al. | 260—448.2 |
| 3,415,715 | 12/1968 | Van Gorcum | 161—190 |
| 3,425,886 | 2/1969 | Heins | 161—186 |

JOHN T. GOOLKASIAN, Primary Examiner

C. B. COSBY, Assistant Examiner

U.S. Cl. X.R.

156—110, 327, 329, 330, 334; 161—190, 207, 208, 217; 260—3.3, 32.4, 32.8, 448.2, 826, 832, 847